(No Model.) 2 Sheets—Sheet 1.

C. C. STUART.
POWER ATTACHMENT FOR SIDE CUTTER HEADS.

No. 520,581. Patented May 29, 1894.

Witnesses
O. L. Sundgren
George Barry

Inventor
Charles C. Stuart
by attorneys
Brown & Seward

THE NATIONAL LITHOGRAPHING COMPANY,
WASHINGTON, D. C.

(No Model.) 2 Sheets—Sheet 2.
C. C. STUART.
POWER ATTACHMENT FOR SIDE CUTTER HEADS.
No. 520,581. Patented May 29, 1894.
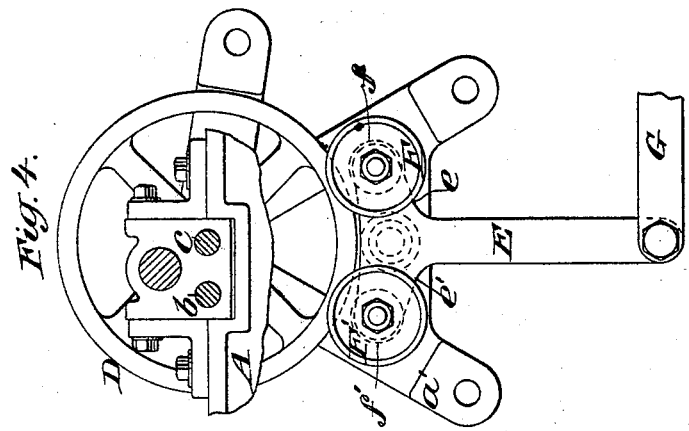
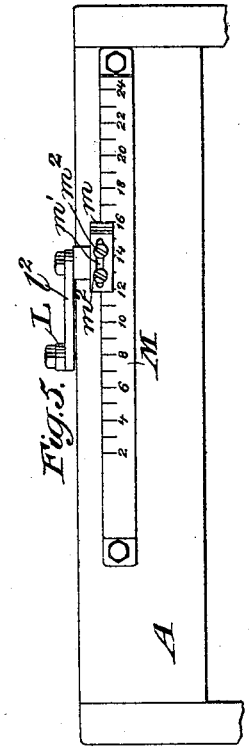
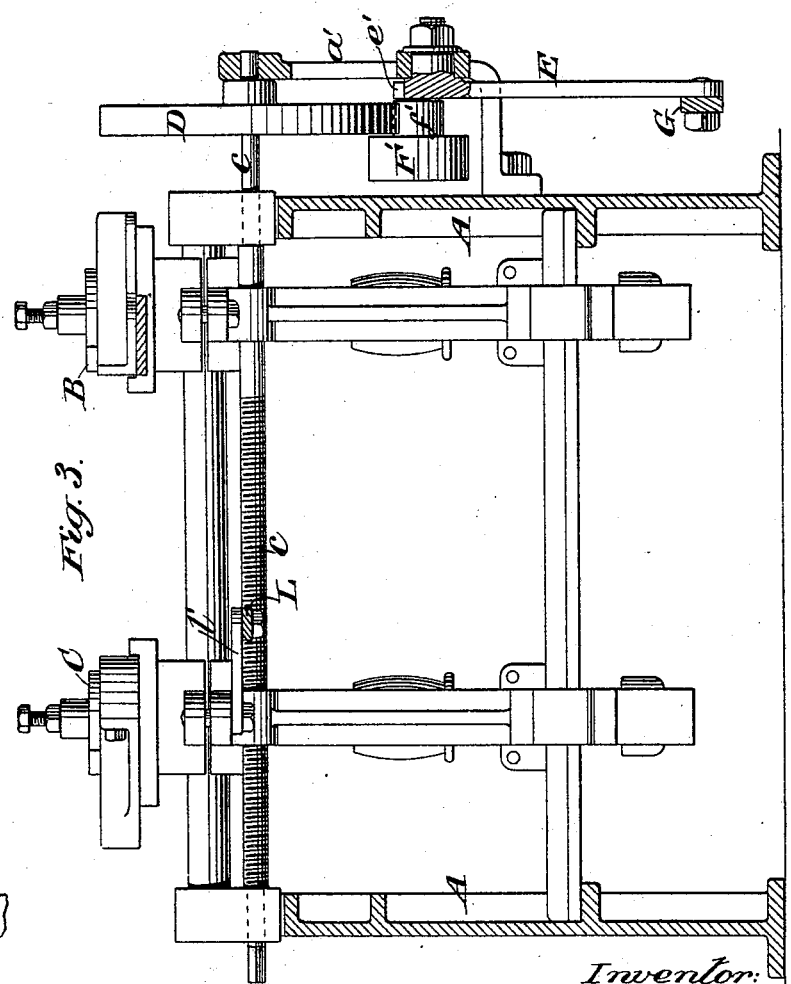
Witnesses:
C. E. Lundgren
George Barry.
Inventor:
Charles C. Stuart
by attorneys
Brown & Seward

UNITED STATES PATENT OFFICE.

CHARLES C. STUART, OF BROOKLYN, NEW YORK, ASSIGNOR TO THE GLEN COVE MACHINE COMPANY, LIMITED, OF SAME PLACE.

POWER ATTACHMENT FOR SIDE CUTTER-HEADS.

SPECIFICATION forming part of Letters Patent No. 520,581, dated May 29, 1894.

Application filed November 14, 1893. Serial No. 490,890. (No model.)

*To all whom it may concern:*

Be it known that I, CHARLES C. STUART, of Brooklyn, in the county of Kings and State of New York, have invented a new and useful Improvement in Power Attachments for Side Cutter-Heads, of which the following is a specification.

My invention relates to an improvement in power attachments for side cutter heads and is particularly well adapted to planers, matchers and molding machines where different widths of stuff are employed to follow one another at frequent intervals during the day.

I have chosen to illustrate my invention in connection with a planing machine and have shown so much of a planer as will be sufficient to disclose a clear idea of the practical application of the power attachment thereto.

Figure 1:
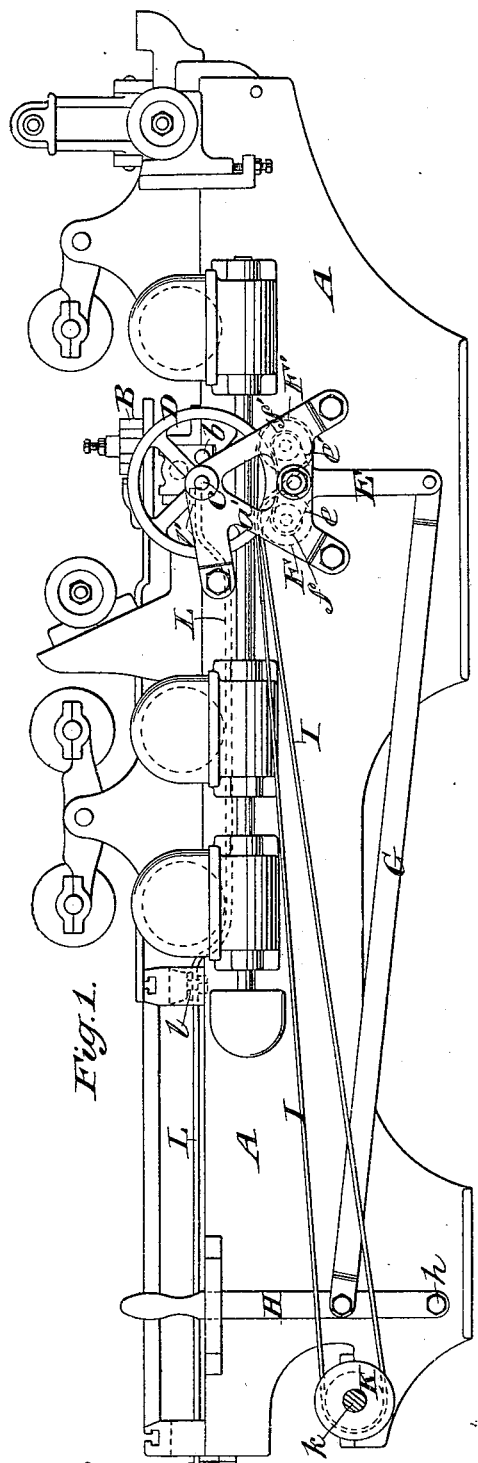
Figure 2:
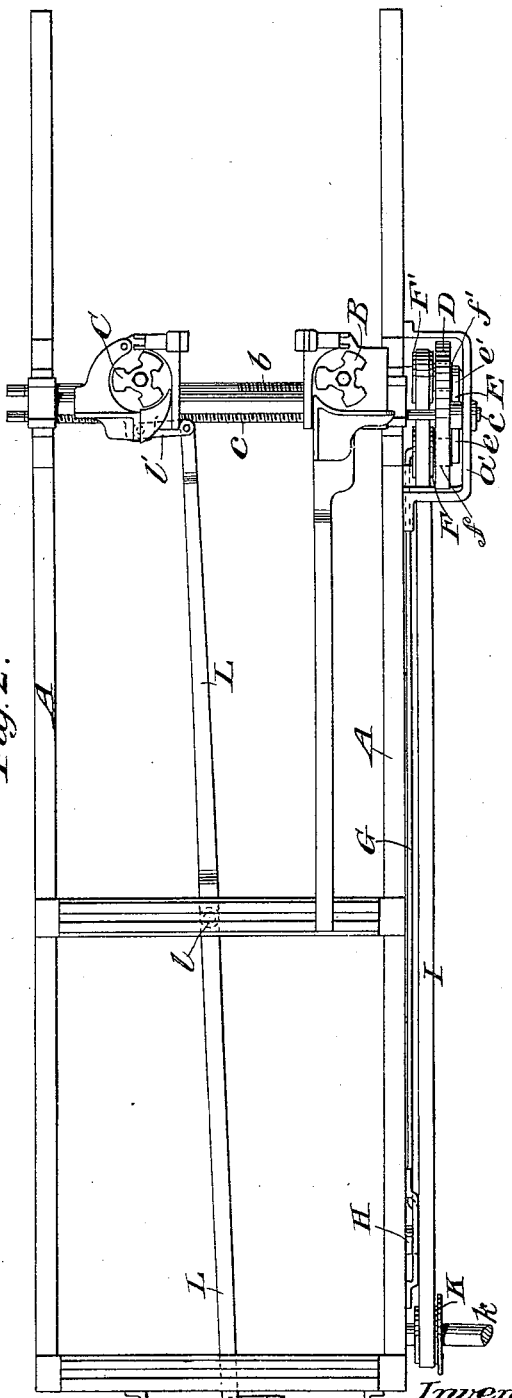

In the accompanying drawings, Figure 1 represents the bed frame of a planer and certain of its operative parts in side elevation, showing the power adjusting device in connection therewith. Fig. 2 is a top plan view of the same, the feed rolls being omitted. Fig. 3 is a transverse vertical section on an enlarged scale. Fig. 4 is a view in detail on an enlarged scale, showing the band and friction pulleys, their rocking support and the wheel with which they engage in side elevation, looking from the inside outwardly, and Fig. 5 is a view of a portion of the end of the machine at which the operator stands, showing the scale which indicates the adjustment of the side cutter head.

In practice it is common to make both the right hand and left hand side cutter heads adjustable but, for purposes of suiting the cutter heads to different widths of stuff as they come in hand in the ordinary course of work, the radical changes to suit the different widths are commonly made in one of the cutter heads only and it is to the shifting of that frequently-adjusted cutter head—in the present instance the left hand cutter head—that my present invention is directed.

The bed frame of the machine is denoted by A, the right hand cutter head by B, the left hand cutter head by C and the screws for shifting the cutter head supports and hence the cutter heads B and C laterally of the bed frame are denoted respectively by $b$ and $c$. The spindle or shank of the adjusting screw $c$ is projected through the side of the bed frame A and is provided exterior to the frame with a friction wheel D secured thereon between the bed frame and a bracket $a'$ fixed to and spaced from the side of the bed frame. In the bracket $a'$ there is journaled a swinging lever E carrying at its upper end in each of its two oppositely diverging branches $e$ and $e'$, a combined band and friction pulley. The portion of the pulley which receives the driving belt is denoted by F and that portion which serves as a friction pulley for engaging the friction wheel D is denoted by $f$. The pulleys F, $f$ are mounted in the arm $e$ of the lever E, while corresponding pulleys F′ and $f'$ are mounted in the oppositely extending arm $e'$ of the lever E.

The lever E is connected by a rod G with an operating lever H pivoted as at $h$ to the side of the bed frame A with its handle within convenient reach of the operator standing at the end of the machine. A drive belt I leads from a drive pulley K on a continuously driven shaft $k$ at the ends of the machine to the pulleys F and F′ carried by the swinging lever E. The belt I passes over and bears upon the pulley F and thence under the pulley F′ and thence back to the drive pulley K. This arrangement causes the pulleys F and F′ and hence the friction pulleys $f$ and $f'$ engaged therewith to rotate in opposite directions and hence when the lever E is swung into position to bring the friction pulley $f$ into engagement with the friction wheel D, it will rotate it and hence the screw $c$ in one direction, and when the said lever is swung to bring the friction pulley $f'$ into engagement with the friction wheel D it will rotate the said screw $c$ in the opposite direction. The connection and arrangement is such that when the operating lever H stands upright or midway of its stroke, the lever E will occupy such a position as to hold both friction pulleys $f$ and $f'$ out of engagement with the friction wheel D and hence the adjusting screw $c$ and the cutter head C affected thereby will remain in fixed position.

Motion is transmitted from the support of the cutter head C to a pointer, which moves along a scale at the end of the machine where the operator stands, by means of a lever L pivoted intermediate of its ends, as at *l*, to a cross piece of the bed frame and connected at one end by a link *l'* with the cutter head support and at the opposite end by a link $l^2$ with the pointer *m* arranged to move along the graduated scale M.

In practice, suppose the operator desires to change the position of the cutter head C with respect to the cutter head B so as to cut stuff narrower or broader than what has just been worked upon: he will simply reach out and take hold of the handle of the lever H, moving it toward him or away from him, according as he wishes to move the cutter head C in the one direction or the other, thereby causing the one or the other of the friction pulleys *f, f'* to engage the friction wheel D and thereby rotating the screw *c* to shift the cutter head. By watching at the same time the travel of the pointer *m* in the one direction or the other along the scale M as the cutter head C moves, he will be enabled to stop the rotation of the screw *c*, by throwing the lever H into the position of its midstroke, the moment the desired adjustment is obtained and the feeding of the lumber may then be continued.

By the above arrangement, I am not only enabled to place the power attachment within the immediate command of the operator but, by doing away with the introduction of the gear into the system of adjustment for conveying the movement of the cutter head to the scale, I am enabled to secure a very precise adjustment of the parts and one that will not be liable to wear sufficient to produce any considerable lost motion. As, however, the cutters themselves gradually wear away, there would necessarily arise some discrepancy between the actual distance between the two cutter heads and that denoted by the scale were there not provided some means for correcting such error at suitable intervals. This I provide for by an elongated slot *m'* in the pointer M, through which the set screws $m^2$ extend to lock the pointer to its support, the said slot admitting of shifting the pointer *m* a slight distance in one direction or the other relatively to its support to make the record exact.

What I claim is—

1. The combination with a side cutter head and a rotary spindle for adjusting the head, of oppositely driven pulleys, and means for transmitting the motion of the one or another of the oppositely driven pulleys to the head adjusting spindle, substantially as set forth.

2. The combination with a side cutter head and a rotary spindle for adjusting the head, of a friction wheel carried by said spindle, a swinging lever, oppositely driven friction pulleys carried by said lever and means for swinging said lever into position to bring either one of said friction pulleys into engagement with the friction wheel on the head adjusting spindle at pleasure, substantially as set forth.

3. The combination with a side cutter head mounted to move across the machine, a rotary screw engaged with the cutter head support for adjusting the cutter head and means for applying power to the rotary screw to rotate it in opposite directions at pleasure, of a scale, a pointer in position to move along the scale and a lever connected with the pointer and with the cutter head support to indicate the extent of movement of the cutter head, substantially as set forth.

4. The combination with the movable cutter head, the rotary screw for adjusting it and the friction wheel engaged with the screw spindle, of a swinging lever, belt and friction pulleys carried by the lever, means for continuously driving the said belt and friction pulleys in opposite directions, an operating lever within convenient reach of the operator at the end of the machine, a connection between the said pulley carrying lever and the operating lever for throwing either of the friction pulleys into engagement with the friction wheel at pleasure, a scale, a pointer arranged to move along the scale and a connection between the pointer and the cutter head support for determining the movement of the latter, substantially as set forth.

5. The combination with the movable cutter head, its operating screw and means for applying power to the screw in opposite directions at pleasure, of a scale, a pointer arranged to move along the scale, a pointer support and a lever connected with the pointer and with the cutter head support, the pointer having an adjustable connection with its support, substantially as set forth.

CHARLES C. STUART.

Witnesses:
IRENE B. DECKER,
FREDK. HAYNES.